Jan. 21, 1969        M. SANDERS        3,422,681

VEHICLE ACTUATED ROADSIDE AIR SAMPLING DEVICE

Filed June 14, 1966

INVENTOR.
Merwyn Sanders
BY
ATTORNEY.

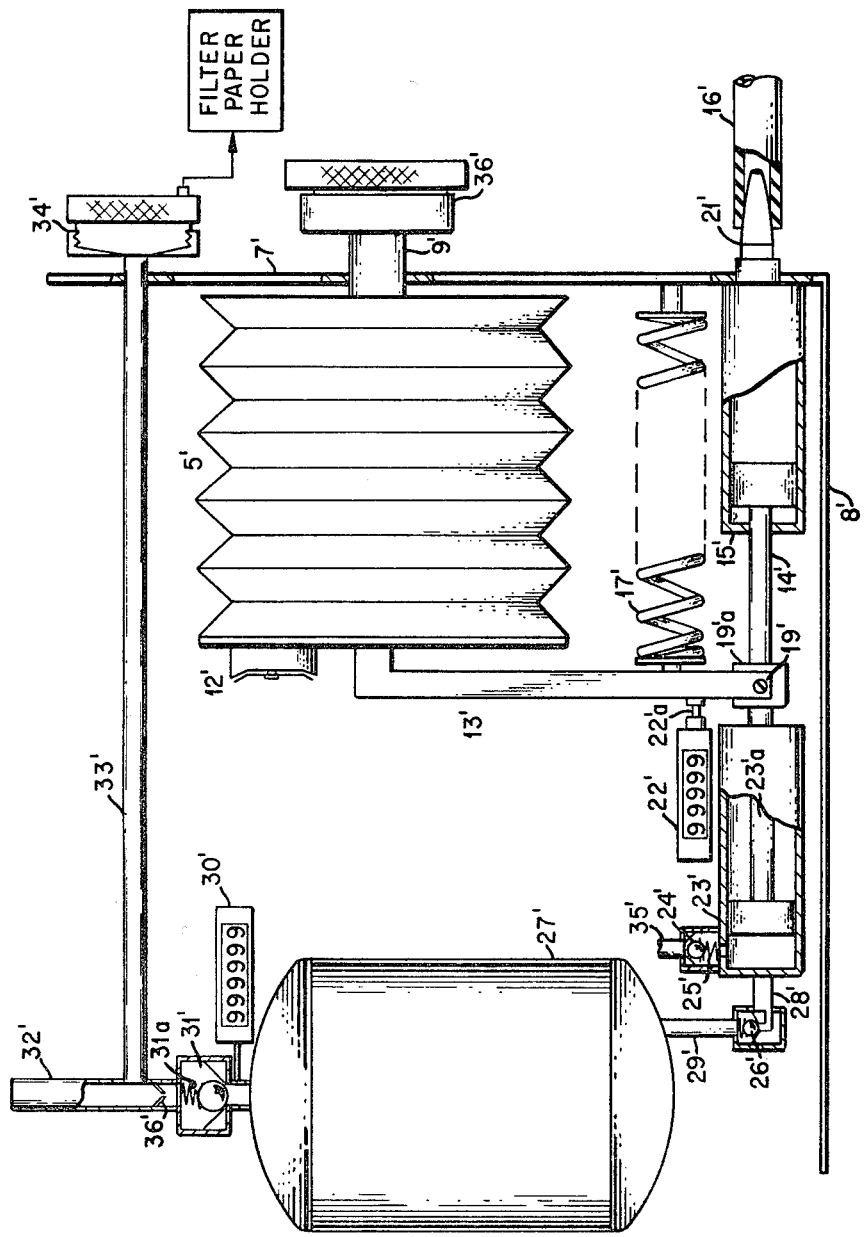

United States Patent Office 3,422,681
Patented Jan. 21, 1969

3,422,681
VEHICLE ACTUATED ROADSIDE AIR SAMPLING DEVICE
Merwyn Sanders, Knoxville, Tenn., assignor to the United States of America as represented by the United States Atomic Energy Commission
Filed June 14, 1966, Ser. No. 558,217
U.S. Cl. 73—421.5           4 Claims
Int. Cl. G01n 1/22

ABSTRACT OF THE DISCLOSURE

A system is provided for taking samples of air from the atmosphere for analysis in the vicinity of road vehicular traffic. The system is powered by a piston cylinder arrangement which is actuated each time an automobile wheel passes over a fluid-filled flexible tube extending from the cylinder. Each time the piston is actuated an expandable container is expanded and contracted drawing air in and exhausting it from the container through separate valves. An immediate analysis is made on the entering air by placing an appropriate filter in the path of the air entering the container. An equilibrium condition sample is taken at predetermined intervals by a storage tank into which is pumped a given volume of air each time the device is actuated. At a given pressure the air is released through an aspirator which draws a sample of air through a second filter to provide equilibrium condition analysis.

---

The invention described herein was made in the course of, or under, a contract with the U.S. Atomic Energy Commission.

This invention relates to a system for sampling the atmosphere in the vicinity of motor vehicular traffic, and more particularly to a system which is powered by the vehicular traffic itself.

Remote air sampling which contemplates securing samples of entrained solids and in testing for carbon monoxide content in air in congested traffic locations and in locations distant from the usual power sources has heretofore been accomplished by battery-powered devices or gasoline engine powered devices, or the like. Such systems require periodic and regular surveillance and replenishing of the energy source. These devices are, therefore, both expensive to fabricate and to maintain.

Applicant with a knowledge of the problems of the prior art has for an object of his invention the provision of a system for instantaneously sampling volumes of air for smog investigation and for other purposes which is powered by the same road traffic that provides the sample.

Applicant has as another object of his invention the provision of a system for sampling air under equilibrium conditions which is economical to build and maintain and which is powered by vehicular traffic.

Applicant has as a further object of his invention the provision of an inexpensive air sampling system of full portability which has an integral power source of substantially unlimited life.

Other objects and advantages of my invention will appear from the following specification and accompanying drawings, and the novel features thereof will be particularly pointed out in the annexed claims.

Figure 1:
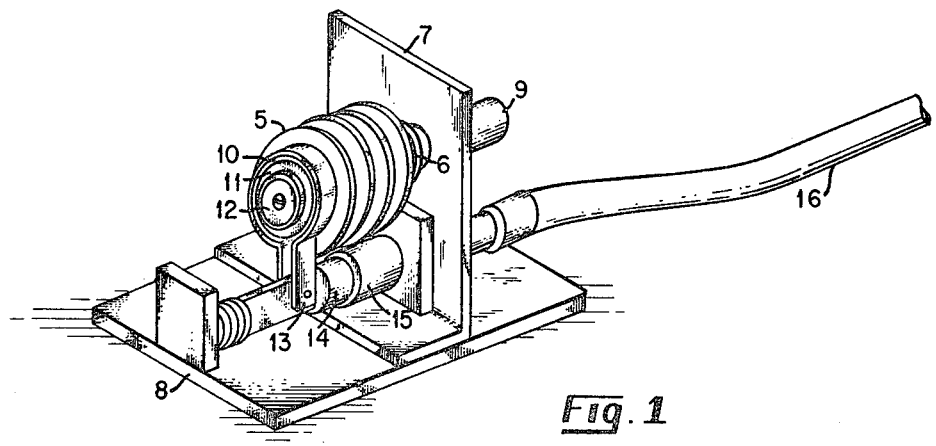
Figure 2:
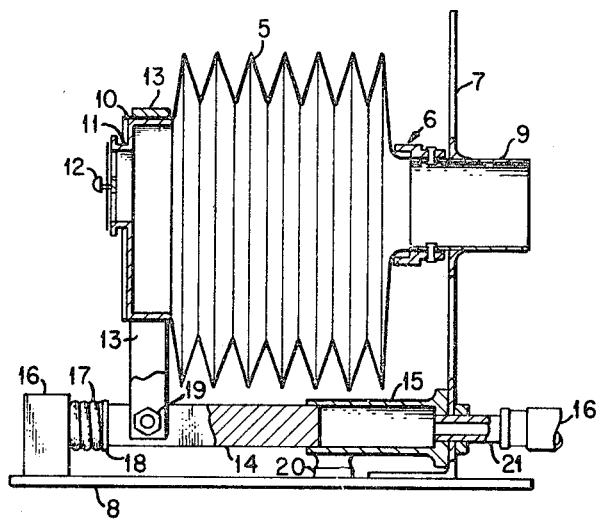

In the drawings, FIG. 1 is a perspective of one modification of my improved air sampling system. FIG. 2 is a cross section in elevation of the system of FIG. 1. FIG. 3 is an elevation, partly in section, of another modification of my improved air sampling system.

Air sampling for smog investigation comprises the act of forcing, usually by suction, a quantity of air through a treated filter, usually paper or a specific trap solution, and thereby entrapping air-borne solids or gases on the filter or within the solution. The sampling period is usually timed so that the volume of air passing through the filter can be determined. A further technique involves substituting an indicating means for the filter paper. When a filter is employed, it must subsequently be retrieved for analysis in a laboratory.

In one embodiment, the present invention employs a rigidly mounted filter head in which a filter paper is mounted and to which is attached one end of a bellows. The other end of the bellows is secured to a hydraulically-operable piston. Reciprocation of the piston, hence the bellows, is accomplished by means of fluctuations in the pressure of a hydraulic fluid contained in a resilient tube attached to the cylinder containing the piston. Pressure fluctuations are generated by the passage of the wheels of a vehicle as the same roll over the tube laid out across a street or the like. As the bellows moves in reciprocal motion, air is pulled through the filter and, on the reverse stroke, exhausted through a check valve on the bellows.

Referring to the drawings in detail, and particularly to FIGS. 1 and 2, a bellows 5 of any suitable material is attached at one of its ends through a sleeve 6 by rivets or otherwise, to a sampling head 9 mounted in an upstanding support 7, integrally secured on a base 8. The sampling head 9 is merely a hollow cylindrical body having means (not shown) for holding a filter-paper disc, or the like.

The other end 10 of the bellows is fitted with a disc plug 11 possessing a "flapper" or check valve 12 through which air may be exhausted only, from the bellows. This end 10 of the bellows is held in place by an expansible band 13 which is connected through bolt 19 to a piston 14 reciprocatably fitted in a cylinder 15 mounted on support 7 and on a pedestal 20 on base 8. Cylinder 15 communicates through a nipple 21 mounted in support 7 with a resilient tube 16, the outboard end of which is closed (not shown). The cylinder and the tube are filled with an incompressible fluid such as an oil. The piston 14 is maintained in normally retracted position by a compression spring 17 joined to abutment post 16 at one end and telescoped about the free end of piston 14 abutting against a disk or annual shoulder 18 on the piston 14.

In use, the device of FIGS. 1 and 2 is secured by its base to the edge of a roadway or other object and the tube 16 is laid out across the roadway, preferably at an angle to the longitudinal axis of the roadway. As vehicles pass over the tube positioned in this manner, the fluid therein is compressed each time a wheel of the vehicle engages it, causing piston 14 to extend from the cylinder and expand bellows 5, pulling air through the filter. Once the vehicle has passed on, the resilient tube expands, withdrawing fluid from the cylinder. Compression spring 17 expands and causes the piston 14 to retract into cylinder 15. Bellows 5 is thus compressed and the air therein exhausts through valve 12.

In this way, the present device samples the air instantaneously in the vicinity of automobiles that pass along the roadway. Carbon monoxide is most frequently the suspect contaminant in such sampling operations. Instead of entrapping particles on a filter paper, one would in sampling for carbon dioxide, substitute a filter medium or other sampler having means for detecting carbon monoxide.

The modification of FIG. 3 can be used either for instantaneous or equilibrium sampling of air, or it may be used for both. It is similar in construction to the structure of FIGS. 1 and 2, particularly insofar as the instantaneous sampling is concerned. The principal difference is in the use of a tension spring 17' instead of the compression spring to restore the piston 14' to retracted position. In addition, a counter 22', appropriately mounted, for engagement with arm 13' has a spindle 22'a which is depressed upon engagement with the arm 13' to actuate the counter. This serves to count the number of strokes of piston 14'. The filter holder 36' is mounted on tube 9' and includes a conventional cup and cap which serves to contain the filter.

The equilibrium sampler is actuated by the same mechanism used for the instantaneous counter. It includes a cylinder 23' with a piston 23'a joined at its outer free end through coupling 19'a to the driving piston 14'. The cylinder 23' has an intake at its inner end which passes through a check valve 24' that employs the usual ball which is normally maintained in closed position by a compressing spring 25'. The intake valve is fed from the atmosphere by a tube 35' of longer or shorter length, as desired, or the intake may be at the cylinder. The outlet of cylinder 23' is connected through lines 28', 29' and check valve 26' to an air storage tank 27', and serves as an intake for the tank. The tank outlet is connected through a "pop" valve 31' which is preferably controlled by a spring 31'a which yieldingly holds the ball in seated position. A vent pipe 32' serves to vent the tank to the atmosphere and is connected to line 33' mounted on plate 7'. Orifice 36' is positioned in line 32' to produce an aspirator effect and draw air from the atmosphere through the filter cup 34'. It is similar to the filter cup 36', heretofore described and mounted on the outer extremity of line 33'. A conventional counter 30' is in communication with tank 27'.

When piston 14' is reciprocated, as described above, each stroke causes air to be sucked into cylinder 23' through valve 24' as piston 14' is retracted, and to be forced up into tank 27' through check valve 26' as piston 14' is extended. This cycle is repeated each time until sufficient pressure is built up in tank 27' to actuate the counter 30', and to operate "pop" valve 31', reset the counter, and pass air through the vent pipe 32'. The suction thus created draws air into sampler 34' from the atmosphere and exhausts it through vent pipe 32'. In this way, the sample collected represents equilibrium conditions in the atmosphere rather than instantaneous conditions produced by immediately passing vehicles.

Having thus described my invention, I claim:

1. A system for taking samples from the atmosphere comprising a collapsible container, a cylinder having a piston coupled to the container for collapsing and expanding the container to cause it to collect and dispense samples from the atmosphere, a sensing device responsive to the passage of vehicular traffic for operating the piston, and a filter in communication with the container for the passage of air therethrough from the container.

2. The system of claim 1 wherein the sensing device includes a flexible tube connected to the cylinder for positioning on the highway for contact with vehicular traffic passing therealong, said tube containing fluid which when the tube is deformed will pass into the cylinder and actuate it, and resilient means for normally maintaining the piston in retracted position.

3. A system for sampling the atmosphere near vehicular traffic comprising a storage tank for receiving volumes of air, piston and cylinder means for supplying air to the tank, a sensing means for positioning on the roadway for contact with the vehicular traffic for supplying hydraulic fluid to the piston and cylinder means to actuate it and supply air to the tank, means for releasing air from the tank at a desired pressure, a sampler, and means responsive to the release of air from the tank for passing air samples through said sampler.

4. The system of claim 3 wherein the cylinder means pumps air into the tank to said desired pressure, and said means for passing air samples through said sampler includes an aspirator vented to the atmosphere and coupled to the tank and to the sampler for drawing samples from the atmosphere in response to the passage of air from the tank through the aspirator to the atmosphere.

References Cited

UNITED STATES PATENTS

| | | | |
|---|---|---|---|
| 2,489,654 | 11/1949 | Main-Smith et al. | 73—421.5 |
| 2,645,940 | 6/1953 | Kohl et al. | 73—421.5 |
| 3,107,517 | 10/1963 | Loyd et al. | 73—23 |

LOUIS R. PRINCE, *Primary Examiner.*

CLEMENT SWISHER, *Assistant Examiner.*